Patented Apr. 20, 1948

2,439,969

UNITED STATES PATENT OFFICE 2,439,969

AMINO-DIOXACYCLOPENTANES

Ernest Fourneau, Paris, France, assignor to Societe des Usines Chimiques Rhone-Poulenc, Paris, France, a French company No Drawing. Application May 8, 1946, Serial No. 668,314. In France April 17, 1944

Section 1, Public Law 690, August 8, 1946
Patent expires April 17, 1964

10 Claims. (Cl. 260—338)

This invention relates to new chemical compounds and to processes of producing the same. More specifically, it concerns new tertiary amines derived from dioxacyclopentane and the quaternary ammonium salts of such amines.

According to the present invention, it has been unexpectedly discovered as a result of research and experimentation that members of the hitherto unknown class of tertiary amines of the general formula:

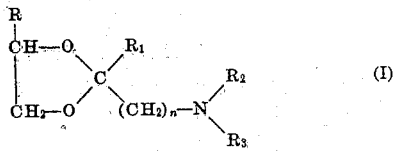

(in which R represents a member of the class consisting of a hydrogen atom and alkyl groups, which may be substituted by a hydroxyl or a dialkylamino group; $R_1$ represents a member of the class consisting of a hydrogen atom and alkyl groups; $R_2$ and $R_3$ represent members of the class consisting of identical and different alkyl groups; and $n$ is an integer) possess in the form of their quaternary salts remarkable physiological properties and are therefore of considerable therapeutic importance.

The tertiary bases of general formula I are obtained in excellent yield by treating the halogen derivatives of the corresponding dioxacyclopentane with a dialkylamine. The quaternary salts may be obtained either directly by condensing the same halogen derivatives with a trialkylamine or, preferably, by adding an alkyl halide or sulphate to the tertiary bases already prepared.

The above-mentioned halogen derivatives employed as starting material may themselves readily be prepared by heating a halogenated acetal, of the type:

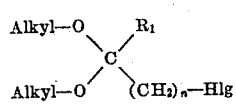

($R_1$ having the same significance as above) with a polyhydric alcohol of the type

where $R_4$ represents a hydrogen atom or an alkyl group, which may be substituted by a hydroxyl group or a halogen atom, permitting of subsequent substitution by a dialkylamino group.

The following non-limitative examples show how the invention may be carried into practice:

*Example I*

31 g. of ethylene glycol and 99 g. bromacetal are heated together on an oil bath for 4 hours at 150° C. and the resulting mixture fractionated in vacuo. There is thus obtained 57 g. of 2 - bromomethyl - 1:3-dioxacyclopentane, B. P. 79°/22 mm. Hg.

25 g. of the foregoing product together with 70 cc. of a benzene solution (33%) of dimethylamine are heated in a sealed tube at 150° C. for 15 hours. After cooling, the methylamine hydrobromide which has crystallized is filtered off, the excess of dimethylamine and benzene removed by distillation and the residue fractionated under reduced pressure. There is thus obtained 18 g. of 2 - dimethylaminomethyl-1:3 - dioxacyclopentane, passing over at 68° C. under 20 mm. pressure. Addition of methyl iodide gives the methiodide which crystallizes from alcohol in platelets, M. P. 196° C.

*Example II*

A mixture of 23 g. of glycerine and 49 g. of bromacetal are heated at 150° C. for 4 hours and the mixture then fractionated under reduced pressure. There is obtained at 152°/20 mm., a 75% yield of 2-bromomethyl-4-hydroxymethyl-1:3-dioxacyclopentane, slightly contaminated with 2-bromomethyl-5-hydroxy-1:3-dioxacyclohexane.

30 g. of the preceding product are heated in a sealed tube at 130° C. for 12 hours with 40 cc. of a 33% dimethylamine solution. Following the procedure of the preceding example, there is obtained, at 137°/27 mm., 2-dimethylaminomethyl-4 - hydroxymethyl - 1:3 - dioxacyclopentane, still containing some 2-dimethylaminomethyl-5-hydroxy-1:3-dioxacyclohexane. Addition of methyl iodide yields two methiodides of which one crystallizes, melting at 175° C., the other noncrystallizable.

By the action of acetyl chloride on the base above described, the acetyl derivative, B. P. 161°/15 mm., is obtained.

*Example III*

A mixture of 55 g. of α-monochlorhydrin of glycerine and 98 g. of bromacetal is heated on an oil bath at 130° C. for 4 hours. By treating the mixture as in the preceding examples, there is obtained a 75% yield of 2-bromomethyl-4-chloromethyl-1:3-dioxacyclopentane, B. P. 112°/18 mm., and this, when heated at 170° C. for 48 hours with 6 molecules of dimethylamine in 30% benzene solution, yields 2:4-di-(dimethylaminomethyl)-1:3-dioxacyclopentane, B. P. 120°/20 mm., of which the dimethiodide melts at 180–181° C. after recrystallization from ethyl alcohol.

*Example IV*

35 g. of bromacetal and 20 g. of pentanetriol-1:2:5 are heated at 130° C. for 4 hours. Fractionated under reduced pressure, the mixture gives a 70% yield of 2-bromomethyl-4(3'-hydroxypropyl)-1:3-dioxacyclopentane which, when treated as in the foregoing examples with excess dimethylamine, gives 2-dimethylaminomethyl-4(3'-hydroxypropyl) - 1:3 - dioxacyclopentane, B. P. 153°/10 mm., of which the methiodide is excessively hygroscopic.

It should be understood that the foregoing examples are purely illustrative and do not in any way limit the scope of the invention. Thus, for instance, the examples are specific (a) to $R_1$ in general formula being hydrogen but $R_1$ may also represent an alkyl group such for example, as a methyl, ethyl or propyl group, (b) to $R_2$ and $R_3$ being methyl but $R_2$ and $R_3$ may also represent different alkyl groups and may, for example, be ethyl, propyl or pentyl groups, (c) to $n$ being 1 but the group $(CH_2)_n$ may be long or short, i. e. $n$ may be a large number for example 10 or, for example, a small number up to 5.

I claim:

1. A compound selected from the group consisting of tertiary amines of the general formula:

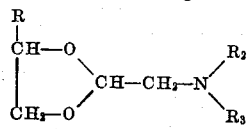

where R represents a member selected from the class consisting of the hydrogen atom and lower alkyl, hydroxyalkyl and dialkylaminoalkyl groups and $R_2$ and $R_3$ are each a lower alkyl group, and the quaternary salts of such amines.

2. A compound selected from the group consisting of 1:3-dioxacylopentanes substituted in the 2-position by a dialkylaminomethyl group and unsubstituted in the 4-position, and quaternary salts of such compounds.

3. A compound selected from the group consisting of 1:3-dioxacylopentanes which are substituted in the 2-position by a dialkylaminomethyl group and in the 4-position by a lower hydroxyalkyl group, and quaternary salts of such compounds.

4. A compound selected from the group consisting of 1:3-dioxacylopentanes which are substituted in the 2-position by a lower dialkylaminomethyl group and in the 4-position by a lower dialkylaminoalkyl group, and quaternary salts of such compounds.

5. A compound selected from the group consisting of 2-dimethylaminomethyl - 1:3 - dioxacyclopentane and its quaternary salts.

6. A compoud selected from the group consisting of 2-dimethylaminomethyl-4-hydroxymethyl-1:3-dioxacyclopentane and its quaternary salts.

7. A compound selected from the group consisting of 2:4-di(dimethylaminomethyl) - 1:3 - dioxacyclopentane and its quaternary salts.

8. 2-dimethylaminomethyl - 1:3 - dioxacyclopentane methiodide.

9. 2-dimethylaminomethyl -4- hydroxymethyl-1:3-dioxacyclopentane methiodide.

10. 2:4 - di(dimethylaminomethyl) 1:3 - dioxacyclopentane methiodide.

ERNEST FOURNEAU.

REFERENCES CITED

The following references are of record in the file of this patent:

UNITED STATES PATENTS

| Number | Name | Date |
|---|---|---|
| 1,824,676 | Mannich | Sept. 22, 1931 |
| 2,406,713 | Senkus | Aug. 27, 1946 |

OTHER REFERENCES

Hibbert et al., J. Am. Chem. Soc. 45, 734 (1923).